G. HILL.
WAVE CHANGER FOR RADIOSIGNALING APPARATUS.
APPLICATION FILED OCT. 7, 1918.

1,345,007.

Patented June 29, 1920.
6 SHEETS—SHEET 1.

INVENTOR
Guy Hill
BY
Herbert G. Ogden
ATTORNEY

G. HILL.
WAVE CHANGER FOR RADIOSIGNALING APPARATUS.
APPLICATION FILED OCT. 7, 1918.

1,345,007.

Patented June 29, 1920.
6 SHEETS—SHEET 2.

INVENTOR
Guy Hill
BY
Herbert G. Ogden
ATTORNEY

G. HILL.
WAVE CHANGER FOR RADIOSIGNALING APPARATUS.
APPLICATION FILED OCT. 7, 1918.

1,345,007.

Patented June 29, 1920.
6 SHEETS—SHEET 3.

INVENTOR
Guy Hill
BY
Herbert G. Ogden
ATTORNEY

G. HILL.
WAVE CHANGER FOR RADIOSIGNALING APPARATUS.
APPLICATION FILED OCT. 7, 1918.

1,345,007.
Patented June 29, 1920.
6 SHEETS—SHEET 4.

INVENTOR
Guy Hill
BY
Herbert G. Ogden
ATTORNEY

G. HILL.
WAVE CHANGER FOR RADIOSIGNALING APPARATUS.
APPLICATION FILED OCT. 7, 1918.

1,345,007.

Patented June 29, 1920.
6 SHEETS—SHEET 5.

INVENTOR
Guy Hill
BY
Herbert G. Ogden
ATTORNEY

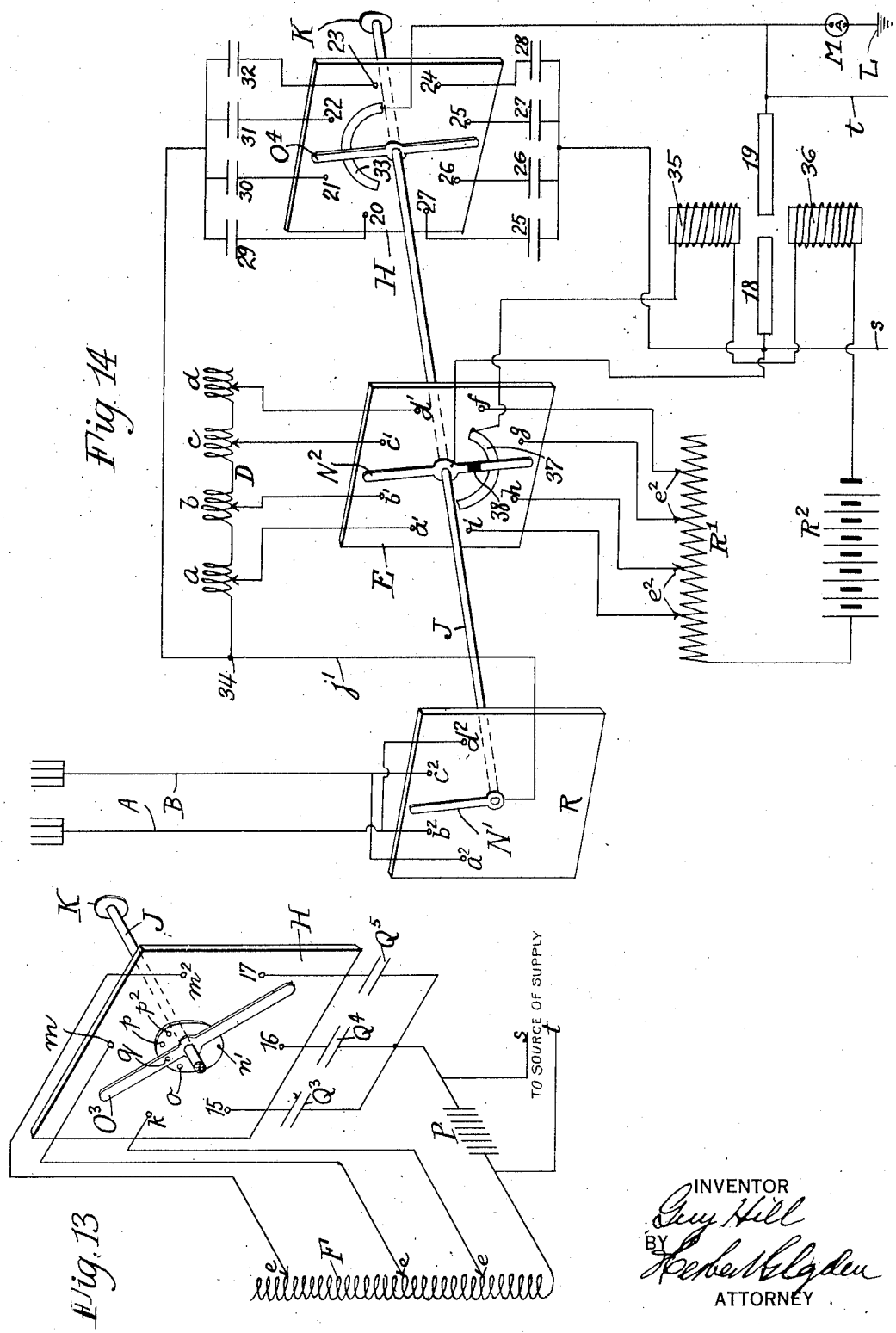

UNITED STATES PATENT OFFICE.

GUY HILL, OF WASHINGTON, DISTRICT OF COLUMBIA.

WAVE-CHANGER FOR RADIOSIGNALING APPARATUS.

1,345,007.  Specification of Letters Patent.  Patented June 29, 1920.

Application filed October 7, 1918. Serial No. 257,180.

*To all whom it may concern:*

Be it known that I, GUY HILL, a citizen of the United States, and a resident of Washington, District of Columbia, have invented certain new and useful Improvements in Wave-Changers for Radiosignaling Apparatus, of which the following is a specification, accompanied by drawings.

This invention relates to radio signaling apparatus but more particularly to wave changing devices for both transmitting apparatus and receiving apparatus for radio energy.

In the co-pending application of myself and George H. Clark, Serial No. 25354, and the co-pending application of George H. Clark, Serial No. 2799, wave changing apparatus has been disclosed for changing from one wave length to another with the maintenance of the pre-determined optimum or desired electrical coupling in the oscillation transformer. The primary object of the present invention is to enable the basic wave changing features heretofore disclosed by us to be applied to either a transmitting or receiving station in which there are a plurality of antennæ, associated with a single transmitting system or a single receiving system, and in accordance with the present invention I provide means for connecting the desired antennæ in the secondary or antenna circuit, while at the same time making the proper adjustments for a change of wave length with maintenance of the optimum or desired electrical coupling.

Further objects of the present invention are to enable the desired antennæ to be connected in circuit while simultaneously carrying out various other features of adjustment for change of wave length which will hereinafter appear in this specification as illustrated in the accompanying drawings, in which—

Figure 1 is a diagrammatic representation of circuits and apparatus at a transmitting station for carrying out the invention in one of its simplest forms, showing two antennæ, for illustrative purposes.

Figs. 2, 3, 4, and 5 are diagrammatic views of modifications of the secondary circuits of Fig. 1, showing various connections for the loading coils, it being understood that these figures may be substituted for the similar portions of Fig. 1.

Fig. 13 is a modification of the primary circuits of Fig. 11 showing a form of condenser switch, which may be used with two or more antennæ, in this instance being shown applied to three antennæ; and Fig. 14 shows the invention applied to an arc set.

In accordance with this invention, transmitting or receiving apparatus for radio energy may be adjusted by a single mechanical operation of an operating handle, so as to change from any one of a plurality of wave lengths or any one of a plurality of antennæ, having different characteristics, to any other desired wave length within the range provided on the same or on one of the other antennæ provided. All necessary adjustments of circuits, and coupling between circuits, is automatically effected by the mechanical operation of the handle referred to. By this means a radio transmitting or receiving set is capable of being adjusted or tuned to two or more wave lengths on two or more different antennæ.

The advantages of such a system, among others, are that larger and smaller antennæ may be used in the same set, and if one antenna becomes disabled or shot away in battle, or otherwise rendered useless, there are one or more antennæ remaining so that communication is uninterrupted.

Figure 1:
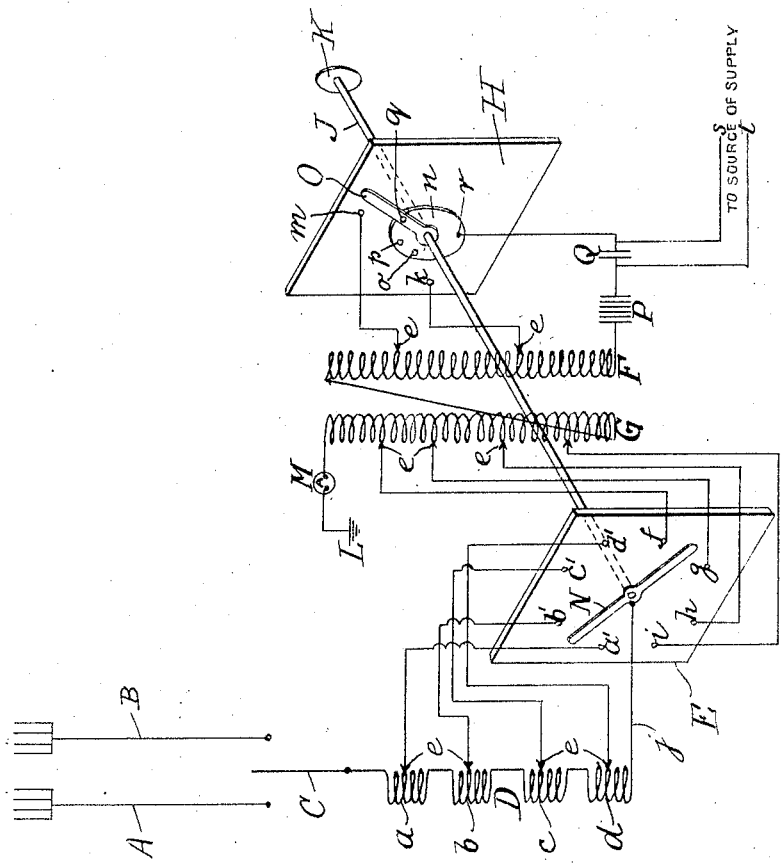

Referring to the drawings, and more particularly to Fig. 1, which is perhaps the simplest form of the apparatus, showing, in this instance, a transmitting set; A represents the larger antenna and B the smaller antenna of a two-antenna set, with a switch C for connecting either antenna to the loading coil system D, which is conveniently arranged in sections $a$, $b$, $c$ and $d$, each section having adjustable slider clips $e$ connected to contacts $a'$, $b'$, $c'$ and $d'$ respectively, on the secondary transmitting panel E. The loading coil sections are merely shown diagrammatically, but they may be individual, flat, spiral coils or else portions of one continuous coil. It is to be understood that these sliders $e$ may be adjusted by means of any of the usual and convenient insulating devices provided for such purposes on standard wave changers, so that adjustments may be made while the set is in operation, and this applies to all the slider clips $e$ shown in the drawings.

The primary coil F and secondary coil G of the oscillation transformer are suitably connected in circuit, and a convenient arrangement for carrying out the invention is to provide a primary transmitting panel H and mount a suitable insulating revoluble switch shaft J in both panels E and H, having a knob or handle K for adjusting the circuits. The secondary coil F of the transformer is assumed to be movable relatively to the primary coil G for variations of coupling, to enable the apparatus to be initially adjusted.

Suitable contact studs $f$, $g$, $h$, and $i$, on the secondary panel E are connected as shown to slider clips $e$ on secondary coupling coil G, which in turn is connected to ground at L through ammeter M. A double switch arm N is connected to shaft J and coöperates with the opposite series of contacts on panel E. This switch arm J is preferably electrically connected by connection $j$ to the end of the loading coil system, to prevent high potential from being developed in the unused portions of the loading coils and consequent loss of energy when short wave lengths are used.

On the primary panel H, contact studs $k$ and $m$ are shown connected to sliders $e$ on primary coil F and as a suitable form of primary switch for my purposes, a conducting disk $n$ is mounted on shaft J and connected to rotate therewith. This disk is provided with holes $o$ and $p$, and a primary switch arm O is loosely mounted on shaft J and adapted to make electrical contact with disk $n$. The arm O as shown is provided with a hole $q$ adapted to register with either one of the holes $o$ and $p$ in the disk $n$, and the arm O may be made to rotate with the disk by inserting a suitable pin (not shown) through the registering holes when the switch arm is adjusted in one or the other of the two possible positions indicated. To complete the primary circuit, a connection is taken from the primary coil through a quenched gap P, or any other suitable generator for oscillating currents, to a condenser Q and thence to the disk $n$ at the point $r$. A suitable source of energy (not shown) for charging the condenser Q and supplying energy to the primary circuit is to be connected to the leads $s$ and $t$. In the simplified circuits of Fig. 1 the wave length depends upon the amount of inductance in circuit in primary coil F, the condenser Q being assumed in this instance to be of fixed value for simplicity of explanation.

In briefly outlining the operation of the set so far described, and in order to simplify the description, variation of coupling will be referred to in terms of distance between primary and secondary coils F and G, instead of in terms of per cent., and it will also be assumed that the primary circuit and the antenna circuit are tuned to the same wave length. If so-called impact or shock excitation sets are used, it is not necessary for these circuits to be in tune, although from my personal experience I have preferred to keep the circuits in tune. Since all circuits, coils and couplings are variable, any necessary refinements in adjustment can readily be made.

*Operation 1.*—Let it be assumed that the set is to be tuned to one of two desired wave lengths, 300 meters for instance, using the larger antenna A.

In Fig. 1, as shown, the primary switch arm O, secondary switch arm N, and the antenna switch arm C are indicated in "off" position. To tune the set, antenna switch C is moved to connect antenna A to the loading coil system D, and the primary switch arm O is connected to disk $n$ by inserting a suitable pin (not shown) through hole $q$ in the arm, and the upper hole $p$ in the disk. The arm and disk will then move together, and by revolving the handle K counter-clockwise, as the drawing is viewed, the arm O is brought into contact with contact $k$ on panel H. The adjustment of the primary and secondary switching elements is such that the secondary switch arm N will at the same time be moved into contact with contacts $a'$ and $f$ on the secondary panel E.

Slider clip $e$ on primary coil F, corresponding to contact $k$, is adjusted until a 300 meter wave is obtained. The coupling distance between primary and secondary coils F and G should preferably be made as great as possible to obtain loose coupling, and a small amount of inductance is connected in secondary coil G by means of slider clip e corresponding to contact f on the secondary panel E.

The slider clip e on section a of the loading coil system D is adjusted until the maximum antenna current is obtained in the ammeter M and the coupling is varied by mechanical movement of secondary coil G with respect to coil F until the antenna current is again a maximum.

If it be assumed that the coupling distance last obtained is five inches, for instance, and that the standard distance to be obtained for the two wave lengths of 300 and 600 meters on the two antennæ is to be two inches, then the coupling distance is reduced to two inches in secondary coil G by means of slider clip e on secondary coil G corresponding to contact f, and by adding inductance in section a of the loading coils by adjustment of its slider clip e. The set will now be properly adjusted for 300 meters but the steps briefly outlined are to be taken as an example only.

*Operation 2.*—To tune the smaller antenna B to the same wave length of 300 meters.

The primary switch arm O is left set on contact k so that the primary circuit will be left unchanged. The arm O is then disconnected from disk n by removing the coupling pin and the disk and shaft J are rotated about 15 degrees clockwise as the drawing is viewed, which also rotates the secondary switch arm N the same number of degrees clockwise bringing arm N into contact with contact studs b' and g, since the angular distance between the studs in each set is designed to be about 15 degrees. The rotation of the disk n has brought hole o in the disk into registry with hole q in arm O, and the disk and arm are then pinned together in this new position.

Antenna B is connected to the loading coil system by antenna switch C and the coupling between primary and secondary coils F and G may be made substantially as loose as possible by obtaining the greatest distance between them. More inductance is placed in secondary coil G, by means of clip e on coil G, corresponding to contact g, because antenna B is smaller than antenna A, and for this reason more inductance will also be required in the loading coil system, which is obtained by adjusting clip e on section b of the loading coils until maximum antenna current is obtained.

The coupling is then adjusted for maximum radiation, and let it be assumed that secondary coil G is found to be within one inch of primary coil F. The coupling is then increased to the standard distance of two inches by adding inductance to section b of the loading coil and by taking inductance out of secondary coil G by adjustment of clip e corresponding to contact g. If the coupling distance found had been more than two inches, the final method of adjustment would have been like that described in connection with the tuning of antenna A to 300 meters. The set is now adjusted to 300 meters on both antennæ.

*Operation 3.*—To tune antenna A to another wave length, for instance, 600 meters.

Antenna A is connected to the loading coils and primary arm O is coupled to disk n by means of coupling pin and hole q in the arm and hole p in the disk. The arm O is then rotated clockwise, as the drawing is viewed, into contact with contact stud m on the primary panel H which correspondingly moves the secondary switch arm N into contact with studs c' and h on panel E.

The tuning then proceeds as before, using the slider clips e corresponding to contact m on the primary panel H, and corresponding to contacts c' and h on the secondary panel E. The turns on the secondary coil G and the amount of inductance in section c of the loading coils are so adjusted that the coupling distance becomes two inches between transformer coils F and G.

*Operation 4.*—To tune antenna B to 600 meters.

Antenna B is connected to the loading coil system and on the primary panel H, the arm O is uncoupled from the disk n, the disk is again rotated clockwise, as before, about 15 degrees until the hole o registers with hole q in the arm, and the arm and disk are again pinned together. Arm N on the secondary panel now makes contact with studs d' and i and the tuning proceeds as in the other cases until the coupling distance becomes two inches.

Having tuned both antennæ to 300 and 600 meters, the set is ready for use, and the operator has only to decide which antenna he desires to use with a given wave length and adjusts the primary switch arm O for that antenna and given wave length. A single movement of operating handle K will enable the set to be connected in tune on the chosen antenna for a given wave length of 300 meters for instance. To change to another wave length of 600 meters, for example, it is only necessary to adjust the primary switch arm O as described so that it makes contact with contact stud m on the primary panel H. Either of the wave lengths can be obtained on the other antenna by similar adjustments as described.

This system has a further advantage. In case both of the original antennæ are destroyed for any reason, as in battle, and it is desired to send on 600 meters, for instance, on an antenna of unknown characteristics, the following is the procedure; the primary arm O is set on contact m to give 600 meters in the primary circuit, and is then entirely unlocked from the disk $n$ and shaft J. Handle K and with it shaft J are rotated so that secondary arm N connects with one after the other of the loading coils sections $a$, $b$, $c$, and $d$. On one of these sections some current will be observed, and assume that it occurs when arm N is on contact $c'$. The slider clip $e$ on secondary coil G corresponding to contact $c'$ is adjusted until maximum current is obtained. By adjusting the coupling for maximum without regard to any standard position, the set will be in tune for 600 meters on the unknown antenna.

The description of operation for Fig. 1 serves to explain the fundamental principles of the invention. In addition various modifications of circuits and apparatus are illustrated which are advantageous in meeting certain conditions.

In Fig. 1 it was assumed that the inductance and capacity of the antennæ in connection with the wave lengths to be used were such that the inductance sections $a$, $b$, $c$, and $d$ of the loading coil system could be connected in series as shown. That is, if arm N is on contact $d'$, Fig. 1, then only part of the inductance of the last section $d$ may be used, while all of the inductance of the other sections is used. It may occur, however, that the desired wave lengths and antennæ are such that the above condition is not possible. Different conditions may be met by suitable modifications of loading coil connections and the use of condensers in the antennæ.

Figure 2:
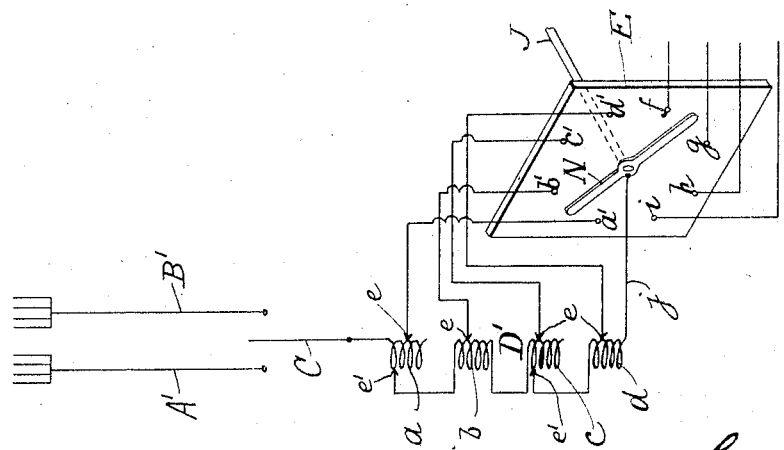
Figure 6:
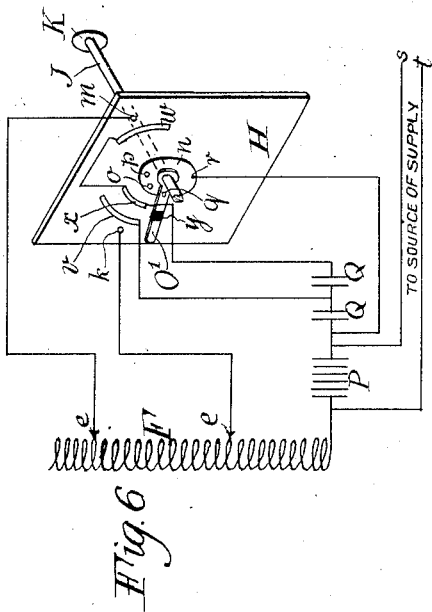
Fig. 6 is a modification of the primary circuits of Fig. 1, showing a form of series parallel condenser switch.

In Fig. 2 a modification of the loading coil circuits of Fig. 1 is shown, adapted to be applied to Fig. 1. The remainder of the secondary circuits and the primary circuits are omitted because they are to be understood as being the same as Fig. 1, or else Fig. 1 with modified primary circuits in accordance with Fig. 6, showing a series parallel condenser switch.

In Fig. 2 two wave lengths are to be obtained on each of two antennæ $A'$ and $B'$, which have nearly the same characteristics as to inductance and capacity, so that approximately the same inductance is required for the same wave length on each antenna. The loading coil system $D'$ is accordingly modified as shown with additional slider clips $e'$ on sections $a$ and $c$, so that the required adjustments may be made, instead of placing substantially all of the inductance in series as in Fig. 1. No series antenna condenser is shown in Fig. 2, as it should not be required.

Figure 3:
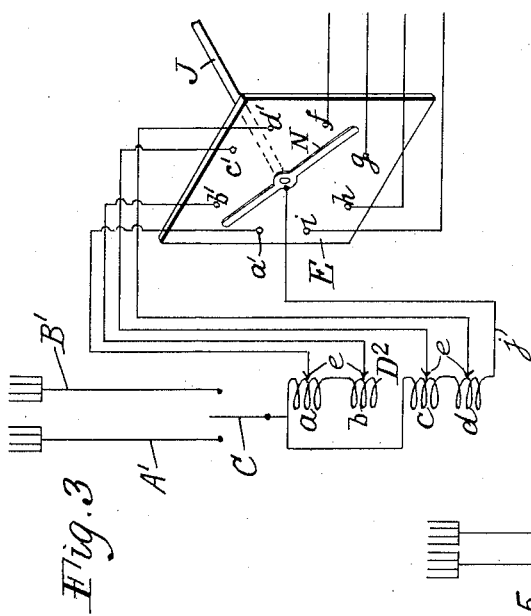

Another modification of the loading coil circuits $D^2$ is shown in Fig. 3 for the same purpose as that shown in Fig. 2.

Figure 4:
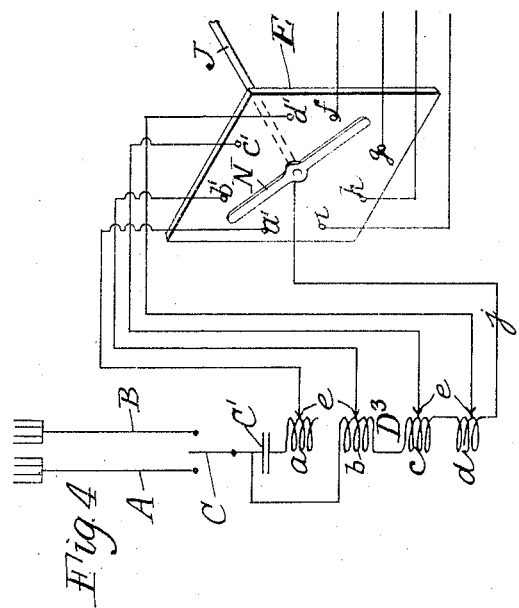

In the modification of the loading coil circuits $D^3$ shown in Fig. 4, two wave lengths are to be obtained on each of two antennæ A and B, the shorter wave length being such that a series, or shortening, antenna condenser $C'$ is required for antenna A. As shown, this condenser $C'$ is only in circuit when arm N is on contact $a'$ on secondary panel E. For the other wave length on antenna A, and for both wave lengths on antenna B, the circuit conditions are shown the same as in Fig. 1.

Figure 5:
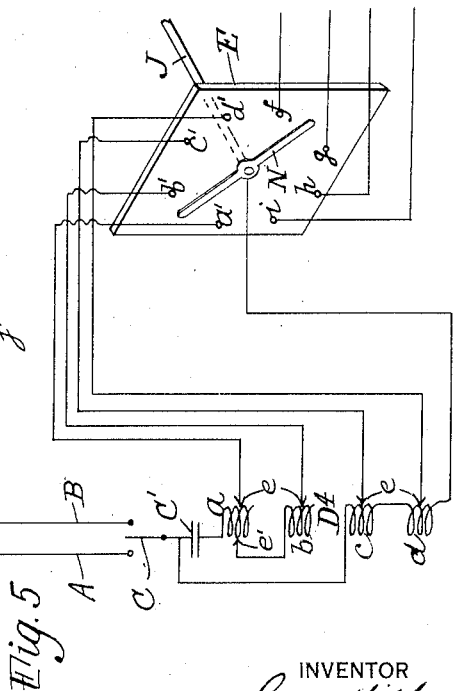

In the modification of Fig. 5, the shorter wave length on each antenna A and B is assumed to require a series or shortening condenser, and the same condenser $C'$ can be used for both antennæ. On the loading coil system $D^4$, the additional slider clip $e'$ on coil $a$ is provided so that none or any desired portion of coil $a$ may be used in series with coil $b$. In Fig. 5 the connections are preferably such that none of the inductance of loading coil sections $a$ or $b$ is in circuit when the longer wave length is used with coils $c$ and $d$.

As a modification of Fig. 1, means may also be provided for automatically changing the value of the primary condenser Q, if necessary, for different wave lengths, and this may be done in a manner similar to that shown in the co-pending application of myself and George H. Clark, Serial No. 25354.

Such a modification is shown in Fig. 6, indicating only so much of the complete set as is necessary to an understanding of the capacity changing elements. Conducting arcs $v$ and $w$ are provided on primary panel H on the same radius and opposite contacts $k$ and $m$ respectively. Another conducting arc $x$ is provided on the panel inside the first arc, and arcs $x$ and $w$ are electrically connected as shown, either on front or back of the panel. The primary arm $O'$ is provided in this instance with an insulating section $y$ intermediate its length.

The capacity is shown as two condensers Q, which may be equal or not as desired, and they are connected in circuit with the arcs and with the disk $n$ as shown. When the arm $O'$ is on contact $k$, the two condensers are in parallel and the primary capacity is equal to their sum. When the arm $O'$ is on contact $m$ the two condensers are in series and the primary capacity is one-half Q, assuming that the condensers are equal.

Figure 7:
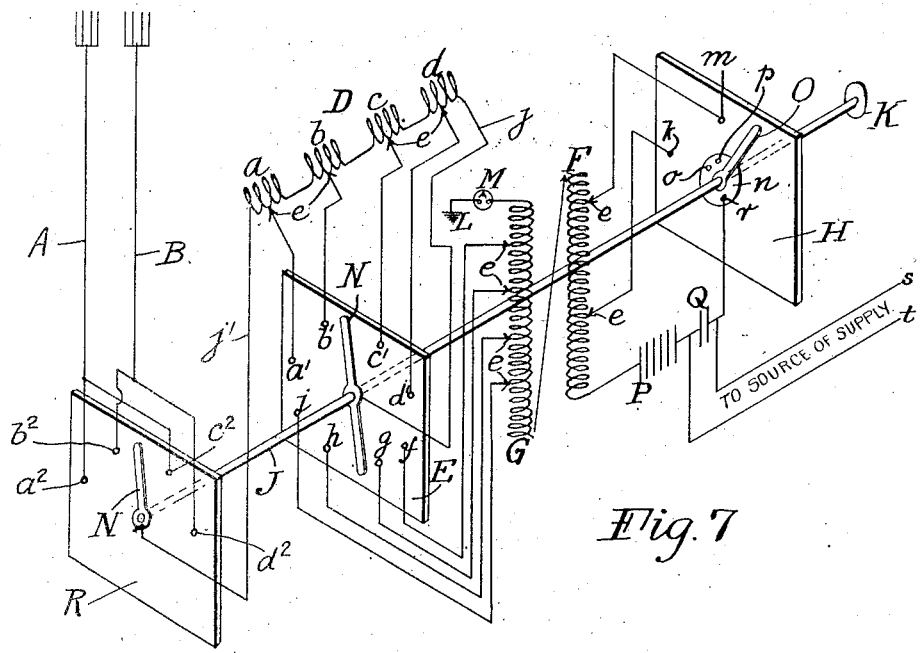
Fig. 7 is a modification in which the change from one antenna to another is made automatically instead of by a separate switch, as in Fig. 1.

In the modification of Fig. 7 means are provided for automatically changing from one antenna to another at the same time the primary arm O is set to the proper position on disk $n$, instead of changing over by means of a separate hand switch C as shown in Fig. 1. In Fig. 7 the shaft J may be extended to another panel R as a convenient form of construction, and an antenna switch arm N' connected to the shaft is adapted to sweep over contacts $a^2$, $b^2$, $c^2$ and $d^2$. Contacts $a^2$ and $c^2$ are electrically connected to each other and to antenna A, while contacts $b^2$ and $d^2$ are similarly connected and also to antenna B. Arm N' is connected to loading coils D by connection $j'$. The angular distance between the contacts on antenna panel R corresponds to the angular spacing of the contacts on secondary panel E, so that manipulation of the switch handle K in changing wave lengths automatically connects the desired antenna to the set. In other respects, the diagram of Fig. 7 although slightly different from Fig. 1 in form and arrangement for convenience of illustration, is similar to Fig. 1.

Figure 8:
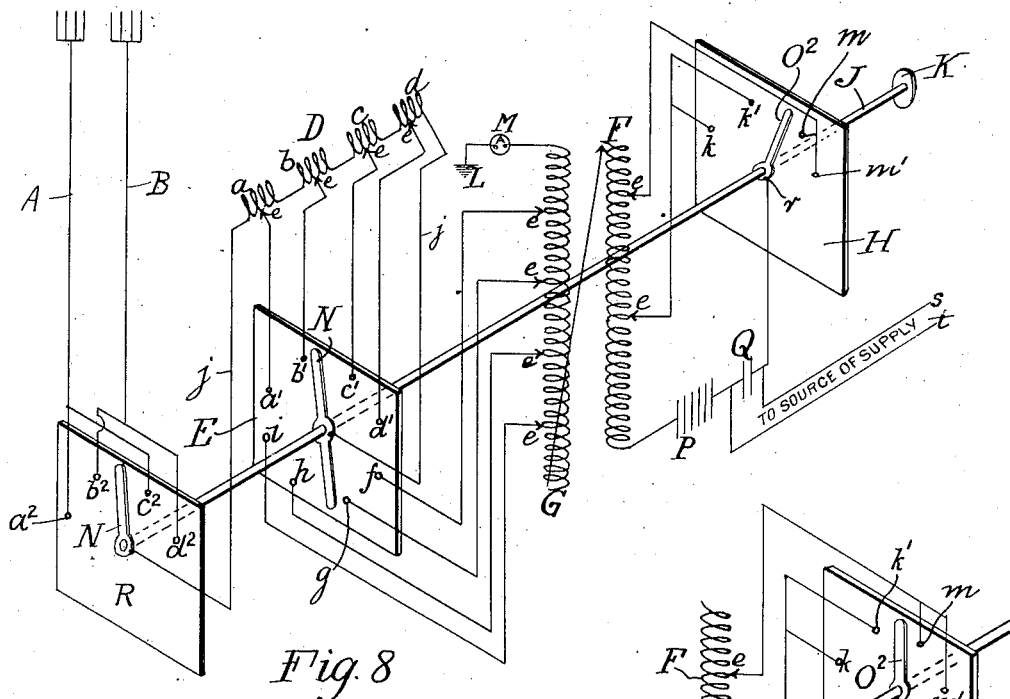
Fig. 8 is a modification of Fig. 7 in which changes in the primary circuits for different antennæ are effected automatically instead of by separate adjustments of the primary switch arm.

Fig. 8 is similar to Fig. 7 except in respect to the primary panel H. Instead of changing from one antenna to the other by changing the angular position of primary arm O on shaft J, means are provided in Fig. 8 for changing over with a single movement of the handle K. For this purpose a primary stud is provided for each antenna and for each wave length so that all necessary changes from one wave length to another and from one antenna to another are made by manipulation of the handle K alone. The contact studs $k$ and $k'$ are electrically connected together and to one clip $e$ on primary coil F, while the studs $m$ and $m'$ are connected to the other clip $e$ on said coil F. Primary arm $O^2$ is fast to shaft J, and when arm $O^2$ is on stud $k$, then secondary arm N will be on studs $a'$ and $f$, and antenna switch arm N' will be on stud $a^2$. The set will thus be adjusted for the shorter wave for instance on antenna A. To send on antenna B, for instance, with this same wave length, primary arm $O^2$ is moved to stud $k'$ and the other elements are correspondingly moved. The modification of loading coil systems shown in Figs. 2, 3, 4, and 5, and the modification of the primary panel for the use of a series parallel capacity switch, may be applied to the sets shown in Figs. 7 and 8 as desired.

Figure 9:
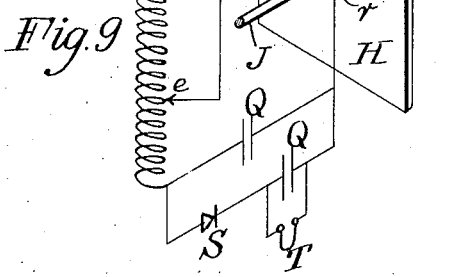
Fig. 9 is a modification of Fig. 8, showing the adaptation of the circuits to a receiver instead of a transmitter.

Fig. 9 shows a modification of the primary circuits of Fig. 8 in order to transform the system into a receiving set. In such case the primary coil F becomes the secondary of the oscillation transformer, and coil G becomes the primary. Fig. 9, as applied to the remainder of the circuits in Fig. 8, illustrates the elementary diagram for a receiving set which enables two wave lengths to be adjusted to two antennæ. In addition to the condensers Q connected as shown, S represents a detector and T are head telephones in parallel to a condenser. By manipulating handle K the movable parts of the set connected to shaft J rotate together and maintain fixed relation. By following the same method described in connection with Fig. 1, the receiving circuits can be tuned and the coupling adjusted to a standard. Changing from one wave length to another or from one antenna to another is accomplished by means of handle K. Any other form of detector may be used, as vacuum tubes similar to those invented by Fleming or de Forest, for instance, and the receiver circuits may be applied with the form of primary switch O shown in Figs. 1 and 7, or with any of the modifications shown in Figs. 2 to 6 inclusive.

In order to make a complete transmitting and receiving system, an additional switch panel V is provided having an antenna switch W coöperating with contacts 2, 3, and 4, 5. The antennæ A and B are connected to the switch W and contact studs 2 and 3 are connected to the studs $a^2$, $b^2$, $c^2$, and $d^2$ on receiver antenna panel R at one side, to the left, while contacts 4 and 5 are connected to contact studs $a^2$, $b^2$, $c^2$ and $d^2$ on transmitter antenna panel R at the other side, to the right. Connection $j'$ on the receiver antenna panel connects to the loading coil system of a complete receiving set as shown in any one of the figures modified in accordance with Fig. 9 for receiving, and connection $j'$ on the transmitter antenna panel connects to the loading coil system of a complete transmitting set shown in any one of the figures or as modified. The main antenna switch W merely connects the two or more antennæ with either the receiver antenna switch panel or the transmitter antenna switch panel. The main shaft J, for convenience, is shown as concentric with all the panels.

Figure 11:
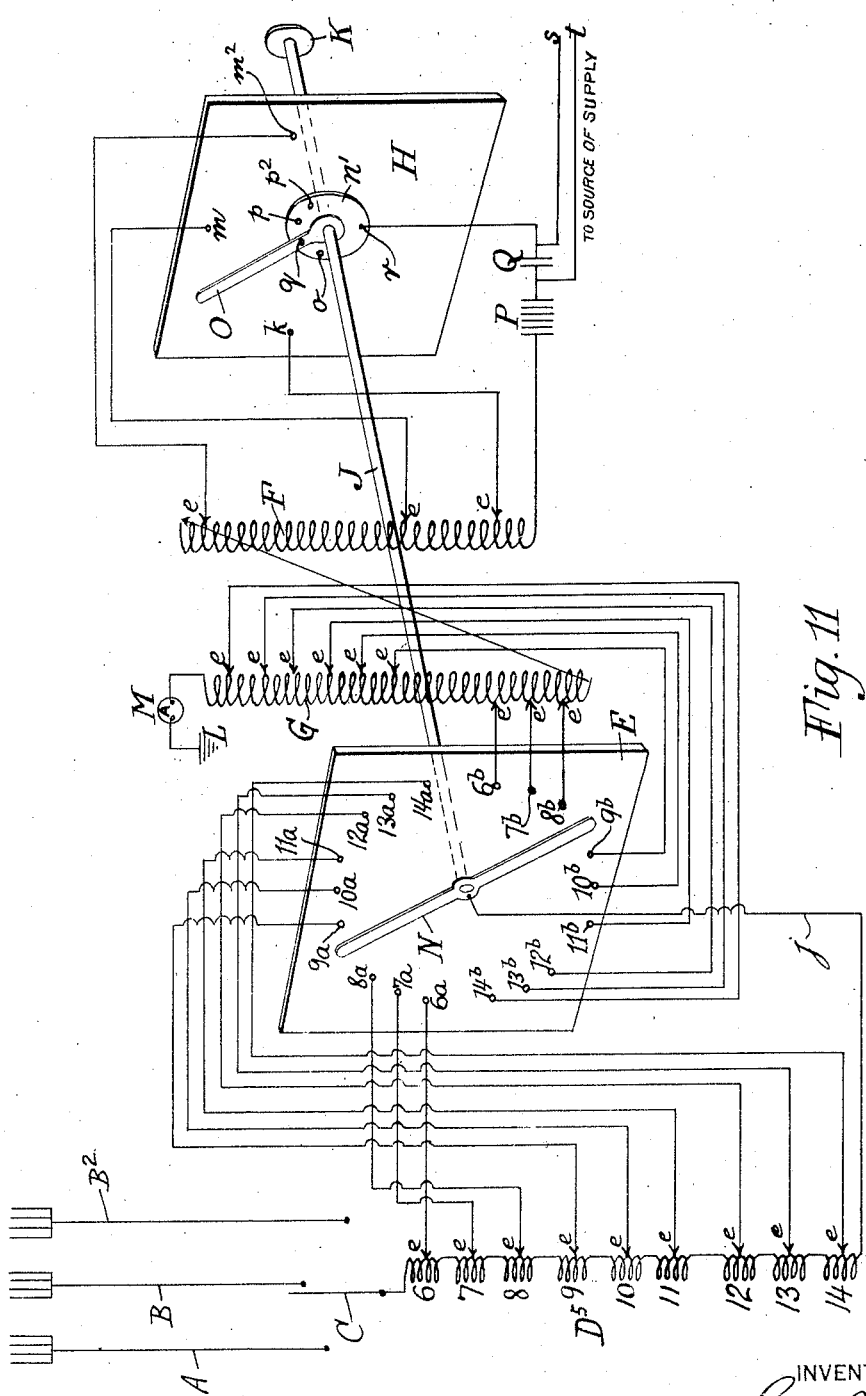
Fig. 11 shows the extension of the system of Fig. 1 to three antennæ instead of two, it being understood that additional antennæ may be used by an extension of the same principles.

An extension of the transmitting or receiving system to three antennæ with three wave lengths for each antenna is shown in Fig. 11. The antenna switch C connects either one of the three antennæ A, B, or $B^2$ to the loading coil system $D^5$, which is made up in this instance of three sets of three coils each, 6, 7, 8; 9, 10, 11; and 12, 13, 14. On secondary panel E are provided three series of studs $6^a$, $7^a$, $8^a$, $9^a$, $10^a$, $11^a$, and $12^a$, $13^a$, $14^a$, connected to slider clips $c$ on the corresponding coils of the loading coil system $D^5$. Another series of studs on the panel, $6^b$, $7^b$, $8^b$; $9^b$ $10^b$, $11^b$; and $12^b$, $13^b$, $14^b$, are connected to slider clips $e$ on the secondary coil G as shown.

An additional hole $p^2$ is provided in the disk $n'$ of the primary panel H and an additional contact stud $m^2$ is provided on the panel. The elements of Fig. 11 for three antennæ correspond to the system and arrangement of the elements in Fig. 1 for two antennæ and the method of tuning and the operation of the three antennæ systems are the same as hereinbefore described in connection with Fig. 1.

If the three antennæ A, B and $B^2$ are of nearly the same characteristics as to inductance and capacity, so that approximately the same inductance is required for the same wave length on each antenna, the loading coil system D⁵ may be modified in accordance with the changes in circuits indicated in Figs. 2 and 3.

Figure 12:
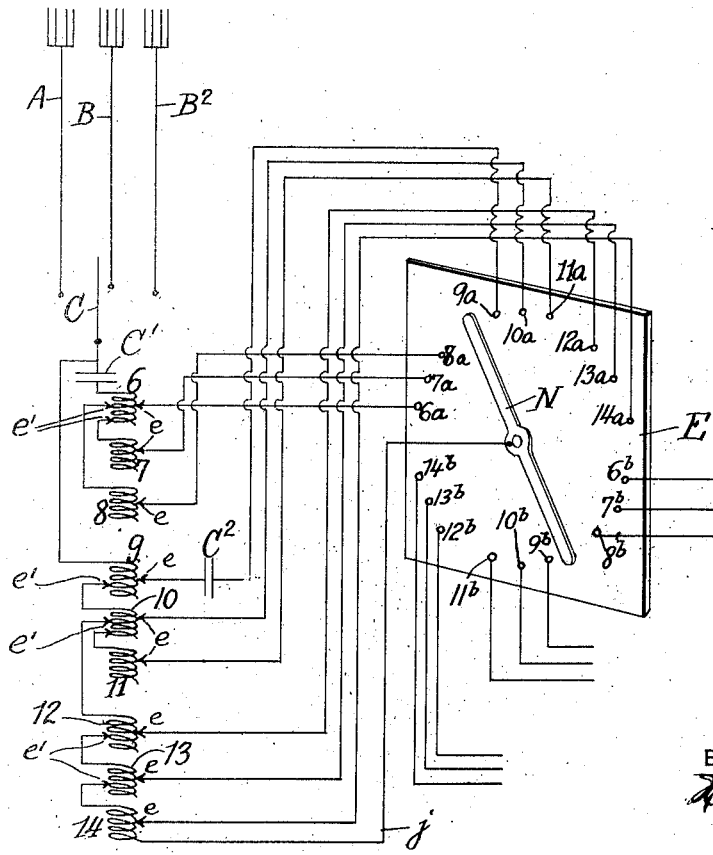
Fig. 12 is a modification of the secondary circuits of Fig. 11 showing different connections for the loading coils.

The modification of the loading coil system D⁶ shown in Fig. 12 illustrates the manner in which the loading coils and shortening condensers C' and C² may be connected to get any necessary or desired values of inductance, or capacity and inductance, in the antenna circuit. The additional slider clips e' on the loading coils are provided so that any desired amount of the inductance of the particular coils on which they are placed may be included in circuit. For the longest wave length on antenna A, none of the loading coil sections 10 and 11 need be used, if the inductance would be too great with their use.

Figure 10:
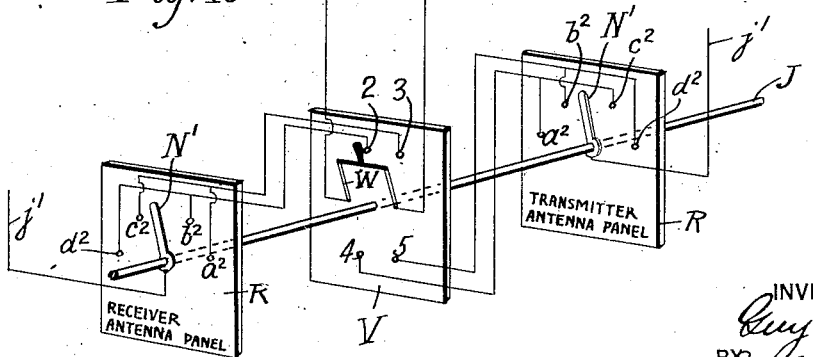
Fig. 10 shows a modification of the circuits of Figs. 7 or 8, for instance to include both transmitting and receiving panels and a changeover switch for the antennæ, so that the system may be used either for transmitting or receiving.

The modifications shown in Figs. 6, 7, 8, 9, and 10 may be applied to Fig. 11 by appropriate changes. That is to say, a system with three or more antennæ may be provided with a series parallel capacity switch in connection with the primary panel H, as indicated for two antennæ in Fig. 6; an automatic antenna switch shown on antenna panel R in Fig. 7 may be made to apply to three or more antennæ; an automatic primary panel switch shown in Fig. 8 may be applied to three or more antennæ; three or more antennæ may be used in a receiving system having receiving apparatus as indicated in Fig. 9; and a combined transmitting and receiving set having three or more antennæ may be provided, using an antenna switch panel V and antenna transmitter and receiver panels as shown in Fig. 10, appropriate regard being had for the proper contact studs and circuits and connections provided for successively including the desired number of antennæ in circuit.

Fig. 13 is a modification of the primary circuits of Fig. 11 showing means for varying the primary capacity for each wave length, if desired. For this purpose additional studs 15, 16 and 17 are added to the primary panel H and connected in this instance to three primary condensers Q³, Q⁴, and Q⁵. The switch arm O³ has an extension adapted to coöperate with studs 15, 16 and 17, and connect one condenser in circuit for each wave length. This modification of a separate condenser for each wave length may be applied to Fig. 1 and as well to all the other figures.

Fig. 14 shows the invention applied to a transmitting system in which no coupling coils are required and the transmitting wave length depends upon the antenna circuit. Such a system is obtained when an arc set is connected directly in the antenna. This same method shown in Fig. 14 applies to some forms of so-called impact sets and also to some bulb transmitters. The circuits for these transmitters are not shown in detail, as it is not considered necessary for bringing out the features of this invention.

In Fig. 14 the elements for an arc set are arranged diagrammatically in connection with the two transmitting panels H and E, the antenna switch panel R, the switch shaft J and operating handle K. Operation of the handle K serves to simultaneously connect the desired antenna A or B in circuit, and also the proper loading inductance, capacity and resistance for the control of the arc. In certain cases the capacity shown can be omitted if desired and also the variation of the resistance in series with the arc.

The electrodes 18 and 19 for the arc are connected to supply mains s and t and also to the antenna circuit as shown, through switch panel H as shown. The switch arm O⁴ on panel H coöperates with arc shaped contact 20 connected to ground at L and to electrode 19, and also sweeps over series of contact studs 20, 21, 22, 23 and 24, 25, 26, 27. For the best operation of an arc set it is preferable to use a condenser shunted across the arc and for this purpose the condensers 25, 26, 27 and 28 are connected in circuit between the arc and the studs 24, 25, 26 and 27, as shown. It is also sometimes advantageous to use a condenser in shunt with the entire antenna current, that is, connected between the antenna and the ground, and for this purpose the condensers 29, 30, 31 and 32 are connected between the studs 20, 21, 22 and 23, and the point 34 in the antenna circuit, as shown.

For the best operation of an arc set, the strength of the magnetic flux across the arc produced by the coils 35 and 36 should preferably be varied for different wave lengths as by means of the resistance R' included in circuit with the coils 35 and 36 and the battery R² or other source of excitation. Adjustable taps or slider clips e² on resistance R' are connected as shown to contact studs f, g, h and i on panel E while connection is also made from coil 35 to arc-shaped contact 37 on panel E. Switch arm N² on panel E is provided with an insulating section 38 as shown and by means of the construction described the resistance R' is varied in accordance with different positions of arm N² for different wave lengths on each antenna, while at the same time adjusting the loading inductance D.

All these variations of loading inductance, condensers and resistance are simultaneously effected by manipulation of the handle K.

The system of Fig. 14 may be made to apply when a high frequency alternator is directly connected in the antenna by substituting an alternator for the arc.

It will be understood that the antennæ illustrated in the drawings are so illustrated for diagrammatic purposes only and that any suitable form of antenna may be used.

It will also be understood that my invention applies to the transmission of signals over wires, such as ordinary telephone or telegraph wires in which cases the word "antenna" as used in the specifications and claims refers to wires extending from the transmitting to the receiving station, or toward the receiving station.

In the claims, the words "radio signaling apparatus" refer to signaling either by telegraph, telephone, or any other method in which energy is transmitted by electrical oscillations of a frequency appropriate to radio-telegraphy (usually above ten thousand cycles per second), although since my invention does not relates to any definite frequency and since it is obviously not dependent upon the use of any particular frequency, a lower frequency might be employed. The words "a plurality of wave-lengths on each of a plurality of antennæ" are to be understood to cover cases in which the wave-lengths used on one antenna are the same or different from the wave-lengths used on the other antenna. The words "an inductance having a plurality of sections" are intended to indicate structures in which the coils are arranged in sections, as $a, b, c, d$, in Figs. 1 and 5, as well as a continuous inductance coil such as F of Fig. 13. In the latter case, each section is a portion of the coil F over which a sliding contact $e$ moves; that is, the coil F, as shown in Fig. 13, has three sections.

I claim and desire to obtain by Letters Patent, the following:

1. In radio signaling apparatus for signaling with a plurality of wave lengths on each of a plurality of antennæ, the combination of a plurality of antennæ adapted to be separately connected in circuit and having various characteristics as to inductance and capacity, an oscillation transformer, an inductance having a plurality of sections, switching mechanism for simultaneously maintaining a predetermined coupling and adjusting for a plurality of different wave lengths on each of said antennæ, said switching mechanism having connections to variable connections on said inductance sections and said variable connections serving to compensate for antenna variations.

2. In radio signaling apparatus for signaling with a plurality of wave lengths on each of a plurality of antennæ, the combination of a plurality of antennæ adapted to be separately connected in circuit and having various characteristics as to inductance and capacity, an oscillation transformer, an inductance having a plurality of sections, switching mechanism for simultaneously maintaining a predetermined mechanical coupling distance between the primary and secondary coils of the transformer for all wave lengths on any of said antennæ and adjusting for a plurality of different wave lengths on each of said antennæ, said switching mechanism having connections to variable connections on said inductance sections and said variable connections serving to compensate for antenna variations.

3. In radio signaling apparatus for signaling with a plurality of wave lengths on each of a plurality of antennæ, the combination of a plurality of antennæ adapted to be separately connected in circuit and having various characteristics as to inductance and capacity, a plurality of inductance sections, a variable connection to each section for varying the amount of such section to compensate for antenna variations in each antenna, primary and secondary coils of an oscillation transformer, means for determining the number of sections of said inductance and the portion of one coil of said transformer in circuit for each wave length on each antenna, means for determining the portion of the other coil of said transformer in circuit for each wave length on each antenna, and means common to all of said means for actuating them in unison.

4. In radio signaling apparatus for signaling with a plurality of wave lengths on each of a plurality of antennæ, the combination of a plurality of antennæ adapted to be separately connected in circuit and having various characteristics as to inductance and capacity, an oscillation transformer, additional inductance in the antenna circuit, and common means capable of actuation by a single mechanical operation for simultaneously connecting in circuit for all of said wave lengths: the desired antenna to the antenna circuit; the necessary inductance in one coil of the oscillation transformer, required to effect a predetermined mechanical relation between the transformer coils, which will produce the optimum or desired electrical coupling for all of said wave lengths with any of said antennæ; the proper amount of inductance in the other coil of the transformer for tuning to the desired wave length; and the required amount of additional inductance in the antenna circuit.

5. In radio signaling apparatus for signaling with a plurality of wave lengths on each of a plurality of antennæ, the combination of a plurality of antennæ adapted to be separately connected in circuit and having various characteristics as to inductance and capacity, an oscillation transformer, additional inductance in the antenna circuit, an antenna shortening condenser, and common means capable of actuation by a single mechanical operation for simultaneously connecting in circuit for all of said wave lengths: the desired antenna to the antenna circuit; the necessary inductance in one coil of the oscillation transformer, required to effect a predetermined mechanical relation between the transformer coils, which will produce the optimum or desired electrical coupling for all of said wave lengths with any of said antennæ; the proper amount of inductance in the other coil of the transformer for tuning to the desired wave length; the required amount of additional inductance in the antenna circuit, and the antenna shortening condenser as desired.

6. In radio signaling apparatus for signaling with a plurality of wave lengths on each of a plurality of antennæ, the combination of a plurality of antennæ adapted to be separately connected in circuit and having various characteristics as to inductance and capacity, an oscillation transformer, capacity adapted to be connected in circuit with one coil of the transformer, additional inductance in the antenna circuit, an antenna shortening condenser and common means capable of actuation by a single mechanical operation for simultaneously connecting in circuit for all of said wave lengths: the desired antenna to the antenna circuit; the necessary inductance in one coil of the oscillation transformer, required to effect a predetermined mechanical relation between the transformer coils, which will produce the optimum or desired electrical coupling for all of said wave lengths with any of said antennæ; the proper amount of capacity and inductance in the other coil of the transformer for tuning to the desired wave length; the required amount of additional inductance in the antenna circuit, and the antenna shortening condenser as desired.

7. In radio signaling apparatus for signaling with a plurality of wave lengths on each of a plurality of antennæ, the combination of a plurality of antennæ adapted to be separately connected in circuit and having various characteristics as to inductance and capacity, variable primary and secondary coils of an oscillation transformer, capacity adapted to be connected in the primary circuit of the transformer, additional inductance in the form of loading coils in the antenna circuit, an antenna shortening condenser, and common means capable of actuation by a single mechanical operation for simultaneously connecting in circuit for all of said wave lengths: the necessary inductance in the secondary of the oscillation transformer, required to effect a predetermined mechanical relation between the primary and secondary coils, which will produce the optimum or desired electrical coupling for all of said wave lengths with any of said antennæ; the proper amounts of capacity and inductance for tuning the primary circuit to the desired wave length; the required amount of additional inductance in the form of loading coils in the antenna circuit; and the antenna shortening condenser as desired.

8. In radio signaling apparatus for signaling with a plurality of wave lengths on each of a plurality of antennæ, the combination of a plurality of antennæ adapted to be separately connected in circuit and having various characteristics as to inductance and capacity, an oscillation transformer, additional inductance in the antenna circuit, and common means capable of actuation by a single mechanical operation for simultaneously connecting in circuit for all of said wave lengths; the desired antenna to the antenna circuit; and the necessary inductance in one coil of the oscillation transformer, required to effect a predetermined mechanical relation between the transformer coils, which will produce the optimum or desired electrical coupling for all of said wave lengths with any of said antennæ.

9. In radio signaling apparatus for signaling with a plurality of wave lengths on each of a plurality of antennæ, the combination of a plurality of antennæ adapted to be separately connected in circuit and having various characteristics as to inductance and capacity, variable primary and secondary coils of an oscillation transformer, capacity adapted to be connected in the primary circuit of the transformer, additional inductance in the form of loading coils in the antenna circuit, and common means capable of actuation by a single mechanical operation for simultaneously connecting in circuit for all of said wave length; the desired antenna to the secondary in antenna circuit; and the proper amounts of capacity and inductance for tuning the primary circuit to the desired wave length.

10. In radio signaling apparatus for signaling with a plurality of wave lengths on each of a plurality of antennæ, the combination of a plurality of antennæ adapted to be separately connected in circuit and having various characteristics as to inductance and capacity, variable primary and secondary coils of an oscillation transformer, additional inductance in the form of loading coils in the antenna circuit, and common means capable of actuation by a single mechanical operation for simultaneously connecting in circuit for all of said wave lengths: the desired antenna to the secondary or antenna circuit; and the required amount of additional inductance in the form of loading coils in the antenna circuit.

11. In radio signaling apparatus for signaling with a plurality of wave lengths on each of a plurality of antennæ, the combination of a plurality of antennæ adapted to be separately connected in circuit and having various characteristics as to inductance and capacity, variable primary and secondary coils of an oscillation transformers, capacity adapted to be connected in the primary circuit of the transformer, additional inductance in the form of loading coils in the antenna circuit, and common means capable of actuation by a single mechanical operation for simultaneously connecting in circuit for all of said wave lengths: the desired antenna to the secondary in antenna circuit; the necessary inductance in the secondary of the oscillation transformer, required to effect a pre-determined mechanical relation between the primary and secondary coils, which will produce the optimum or desired electrical coupling for all of said wave lengths with any of said antennæ; and the proper amounts of capacity and inductance for tuning the primary circuit to the desired wave length.

12. In radio signaling apparatus for signaling with a plurality of wave lengths on each of a plurality of antennæ, the combination of a plurality of antennæ adapted to be separately connected in circuit and having various characteristics as to inductance and capacity, variable primary and secondary coils of an oscillation transformer, capacity adapted to be connected in the primary circuit of the transformer, additional inductance in the form of loading coils in the antenna circuit, and common means capable of actuation by a single mechanical operation for simultaneously connecting in circuit for all of said wave lengths; the desired antenna to the secondary in antenna circuit; the necessary inductance in the secondary of the oscillation transformer, required to effect a predetermined mechanical relation between the primary and secondary coils, which will produce the optimum or desired electrical coupling for all of said wave lengths with any of said antennæ; and the proper amounts of capacity and inductance for tuning the primary circuit to the desired wave length, and the required amount of additional inductance in the form of loading coils in the antenna circuit.

13. In radio signaling apparatus for signaling with a plurality of wave lengths on each of a plurality of antennæ, the combination of a plurality of antennæ adapted to be separately connected in circuit and having various characteristics as to inductance and capacity, variable primary and secondary coils of an oscillation transformer, capacity adapted to be connected in the primary circuit of the transformer, additional inductance in the form of loading coils in the antenna circuit, and common means capable of actuation by a single mechanical operation for simultaneously connecting in circuit for all of said wave lengths; the desired antenna to the secondary in antenna circuit; and the proper amounts of capacity and inductance for tuning the primary circuit to the desired wave length, and the required amount of additional inductance in the form of loading coils in the antenna circuit.

14. In radio signaling apparatus for signaling with a plurality of wave lengths on each of a plurality of antennæ, the combination of a plurality of antennæ adapted to be separately connected in circuit and having various characteristics as to inductance and capacity, an oscillation transformer, additional inductance in the antenna circuit, and common means capable of actuation of a single mechanical operation for simultaneously connecting in circuit for all of said wave lengths; the desired antenna to the antenna circuit; the necessary inductance in one coil of the oscillation transformer, required to effect a predetermined mechanical relation between the transformer coils, which will produce the optimum or desired electrical coupling for all of said wave lengths with any of said antennæ, and the required amount of additional inductance in the form of loading coils in the antenna circuit.

15. In radio signaling apparatus for signaling with a plurality of wave lengths on each of a plurality of antennæ, the combination of a plurality of antennæ adapted to be separately connected in circuit and having various characteristics as to inductance and capacity, variable primary and secondary coils of an oscillation transformer, additional inductance in the form of loading coils in the antenna circuit, an antenna shortening condenser, and common means capable of actuation by a single mechanical operation for simultaneously connecting in circuit for all of said wave lengths: the desired antennæ to the secondary or antenna circuit; the required amount of additional inductance in the form of loading coils in the antenna circuit; and the antenna shortening condenser as desired.

16. In radio signaling apparatus for signaling with a plurality of wave lengths on each of a plurality of antennæ, the combination of a plurality of antennæ adapted to be separately connected in circuit and having various characteristics as to inductance and capacity, an inductance having a plurality of sections and switching mechanism capable of simultaneously connecting to a desired antenna and to the proper inductance section to give the desired wave length on said antenna, such switching mechanism having connections to variable connections on said inductance sections and said variable connections serving to compensate for antenna variations.

17. In radio signaling apparatus for signaling with a plurality of wave lengths on each of a plurality of antennæ having various characteristics as to inductance and capacity, a plurality of contacts, an oscillation transformer, an inductance having a plurality of sections, switching mechanism coöperating with said contacts for simultaneously maintaining a predetermined coupling and adjusting for a plurality of different wave lengths on each of the antennæ for which the set is adapted, said switching mechanism having connections to variable connections on said inductance sections, said variable connections serving to compensate for variations in the antennæ with which the apparatus is adapted to be used.

In testimony whereof I have signed this specification in the presence of two subscribing witnesses.

GUY HILL.

Witnesses:
   HERBERT G. OGDEN,
   M. H. PAYNE.